Figure 1:
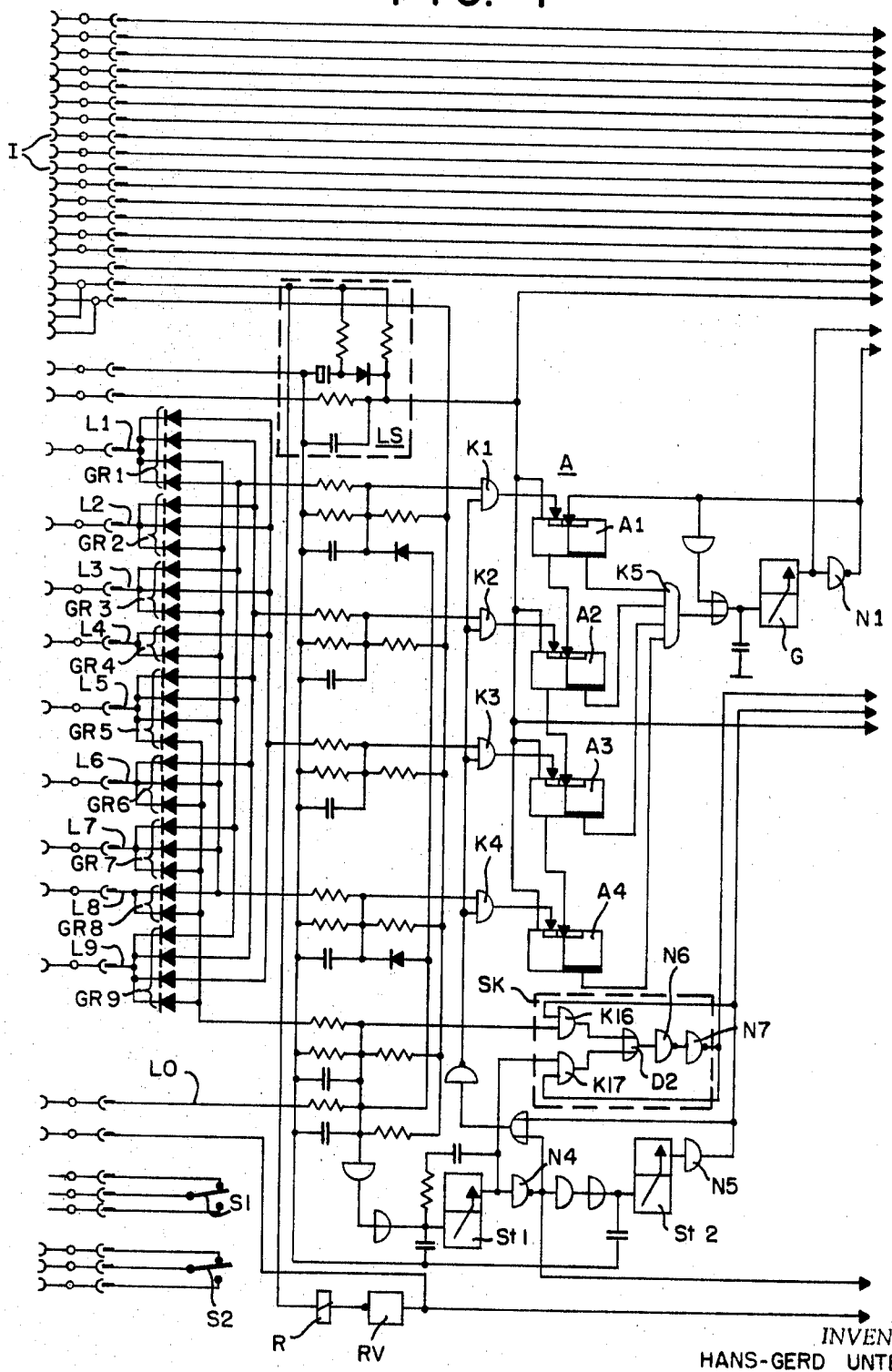

United States Patent

[11] 3,593,009

| [72] | Inventors | Hans-Gerd Unterschutz;<br>Ernst Kutschbach, Karl-Marx-Stadt, both of, Germany |
|---|---|---|
| [21] | Appl. No. | 859,910 |
| [22] | Filed | Sept. 22, 1969 |
| [45] | Patented | July 13, 1971 |
| [73] | Assignee | VEB Kombinat Zentronik Karl-Marx-Stadt Postschliessfach, Germany |

[54] DEVICE FOR CHECKING OF PRECALCULATED NUMBERS
3 Claims, 2 Drawing Figs.

[52] U.S. Cl. .................................................. 235/153, 340/146.1
[51] Int. Cl. ....................................................... G06f 11/10, H04l 1/10
[50] Field of Search .......................................... 235/153

[56] References Cited
UNITED STATES PATENTS
3,235,716  2/1966  Porter et al. ................... 235/153

Primary Examiner—Malcolm A. Morrison
Assistant Examiner—R. Stephen Dildine, Jr.
Attorney—Nolte and Nolte

ABSTRACT: The device comprises groups of diodes for coding respective digits of the number under test, a first counter, an adjustment pulse generator connected between the groups of diodes and the first counter to set the same to a complementary number, resetting pulse generator means, second and third counters, AND and OR gate members, a flip-flop circuit controlled by the input of the device, means for inverting the pulses from the resetting pulse generator and alternately feeding the same for the addition in the second and third counter to provide a constant residual number.

DEVICE FOR CHECKING OF PRECALCULATED NUMBERS

The present invention relates to an electric device for check of precalculated numbers. In particular, the present invention relates to the checking of precalculated numerals which have been completed by a checking digit in such a manner that the sum of all digits that have been alternately multiplied by factors "one" and "two" will produce according to a predetermined module a constant residual numeral. The number of digits in the calculated numerals can be an arbitrary number and the factor for the lowest decimal place always remains constant.

In order to uncover errors which may occur in data-processing machines and systems during the data processing and transferring operations, there have been employed built-in checking devices. However, the main percentage of the errors occurs during the manual data acquisition which process is not supervised by the built-in checking systems. It has been also known in numeral checking methods how to complement order designation or digital sequences by a control digit through which the order designations have been checked. Accordingly, devices have been proposed in which the precalculated and by a control digit complemented numerals are checked in such a way that the sum of all digits in a digital sequence which has a decimal place of a certain significance will produce a constant residual number according to modules 9, 11 or 13.

In the West German Pat. application, Ser. No. WD 1,282,336, a device for checking of numbers according to module 10 has been disclosed, wherein the digits of a number to be checked are alternately multiplied by factors 2 and 1. Irrespective of the amount of decimal places, a constant factor is attributed to the lowest decimal place. By the aid of a selective device and by a digital place counter, each of the introduced digits is fed into two coding devices, and each coded digit into a counter. The final result from each counter is fed to respective check number registers which, during the introduction of a subsequent number, pass their contents to a comparing device. In the comparing device, the digital value of the contents from the control number register is compared with the value of the last numeral which is present in a buffer register.

Checking methods according to a module $\geq 11$ are disadvantageous for the reason that not all numbers are suitable for being checked by means of a single digit control number. If the checking method according to module 9 is to be applied, it must be taken into account that two digits of a decimal system must always have in an arithmetic unit the same binary or dual value, thus impairing the reliability of the entire controlling process. The prior art devices for performing the checking method according to module 10 are, on the other hand, very expensive. For example, to introduce a number to be processed into the machine, there have been necessary two coding devices which must be adapted for forwarding each of the two coded values of the number to separate counters. Besides, it has been also necessary in such prior art controlling embodiments that the final results from the counters be applied to a comparating device where, via a buffer register, the value of the last digit of a digital sequence has been introduced, thus determining the releasing step for the blocking stage of the machine.

The object of the present invention is to provide a circuit arrangement for checking precalculated numbers according to module 10, whereby the multiplication of digits by factors 2 and 1, as well as the checking for the correctness of the introduced numerals, are accomplished with a substantially reduced number of parts, and wherein during the summation of respective digits the partial products both in the "unit" places and in the "ten" places are taken into account.

According to the present invention, the above objects are attained by providing in the checking circuit a first counter having flip-flop stages which are adjustable for a complementary value of every digit introduced into the counter, and readjustable to a zero condition by means of a pulse generator which generates timing or synchronization pulses corresponding to numerical values of respective digits. These pulses from the generator are added via AND gate members in second and third counters, each of the latter counters having flip-flop stages of a counting capacity corresponding to the employed module. The pulses are inverted and fed into the AND gate members of the second and third counters, respectively. A flip-flop circuit which is adapted to be activated by every introduction of a digit, controls alternatively the operation of the second or the third counter for the reception of the inverted pulses. A registering circuit is provided for the addition of all corresponding partial products resulting due to the employed module 10. One input of the registering circuit is connected with a diode group for FIGS. 5 to 9 and another input which serves for the self-holding of the registering circuit, is connected to diode groups for FIGS. 1 to 9 and to a lead for the FIG. "0." The output of the registering circuit is connected to AND gate members of the second and third counters. The operation of the generator is dependent on the state of flip-flop stages in the first counter.

Figure 2:
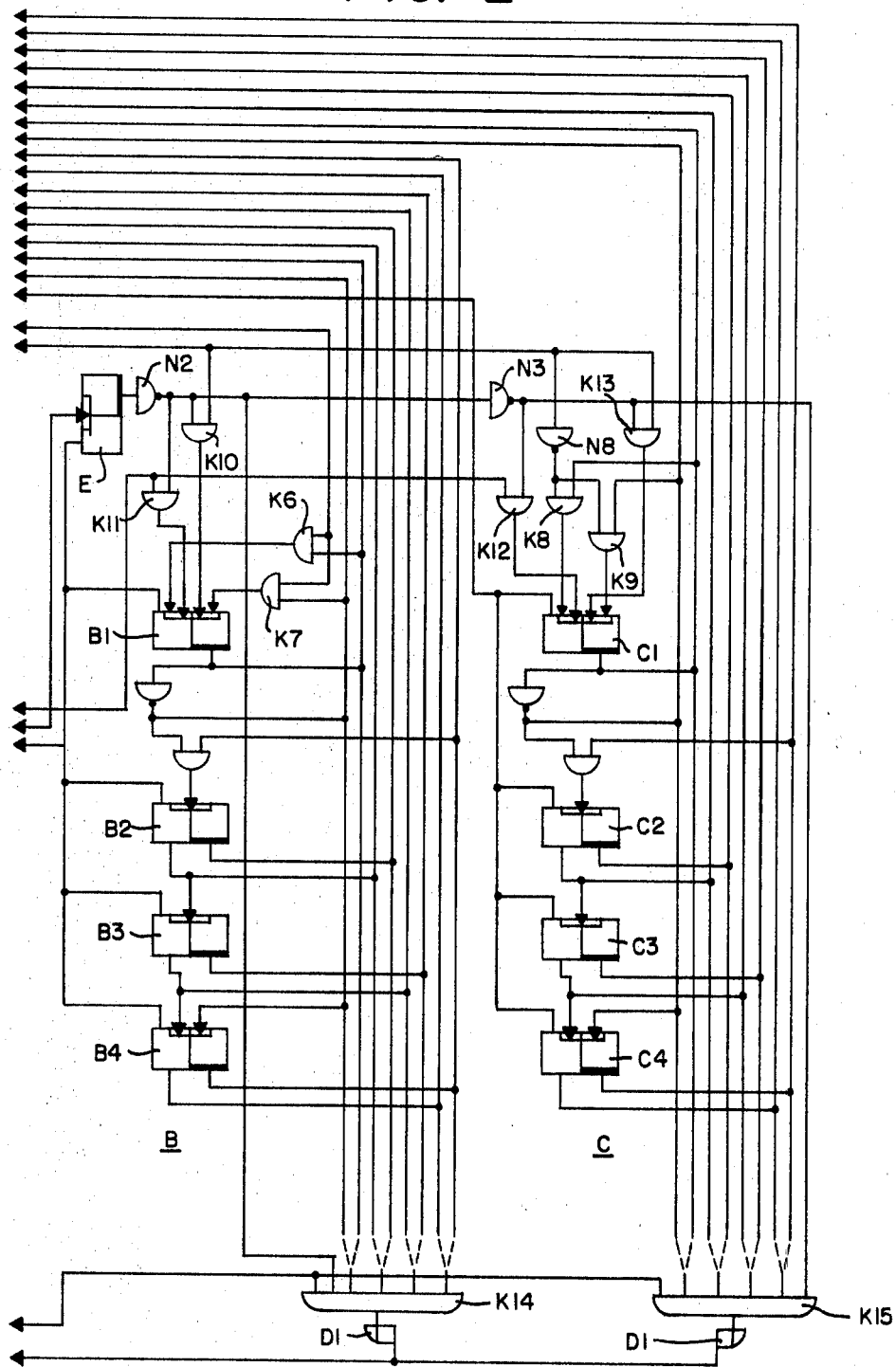

In order that the present invention may be readily carried into effect, one embodiment thereof will be now described in more detail with reference to the accompanying drawing, wherein:

FIG. 1 is an input section of a numeral checking device according to the present invention; and FIG. 2 is an output section of the device of FIG. 1, and is a continuation of the right side of FIG. 1.

The circuit arrangement of the number checking device of FIGS. 1 and 2, and the mode of operation thereof, is as follows:

Upon pressing a key contact (not shown) which is operatively coupled to a digit conduit (LO—L9), an electrical path is completed for the actuation of the first Schmitt trigger circuit ST 1 which — after a delay time — generates a control pulse lasting for the time delay of a subsequently connected second Schmitt trigger circuit ST 2. Numerical values 1—9 are coded in diode groups GR1 to GR9 in such a manner that the dual or binary values of the 16's complement are fed into an input of respective AND gate members K1 through K4.

In accordance with the digit which is correlated to the closed key contact, the flip-flop stages A1 to A4 of the counter A are triggered by the control pulse to include into the counter the 16's complement of the digit corresponding to the figure of the actuated key contact. As soon as one or more of the flip-flop stages A1 to A4 are operated, the AND gate K5 having four inputs connected with respective outputs of flip-flop stages A1—A4 is brought to a "0" potential. Due to the zero potential state at the AND gate K5 output, the pulse generator G is released for the generation of synchronizing or timing pulses, which via a inverter or negator N1 resets the flip-flop stages A1 to A4 to their normal condition, by which action the generator G is blocked again. Consequently, at the output of the generator G as well as at the output of inverter N1, there are produced as many pulses as to comply with the numerical value of the digit of the actuated key contact. The pulses are applied via AND gate members K6 and K7 to respective inputs of a flip-flop stage B1 of a second counter B (with flip-flop stages B1—B4) on the one hand, and via a negation member or inverter N1, an inverter N8 and AND gate members K8 and K9 to inputs of flip-flop stage C1 of the third counter C (having flip-flop stages C1—C4). The inverted synchronization pulses which result behind the inverter N1 are applied either via AND gate member K10 to counter B or via the AND gate member K13 to counter C.

The selection is made by means of flip-flop circuit E which is coupled with an inverter N2, the output of the latter being connected to the second input of AND gate member K10. The input of inverter N3 is connected to the output of inverter N2 whereas the output of N3 is coupled to the second input of AND gate member K13. By this connection it is attained that only those digital values are added in one of the counters B or C which have been multiplied by the sequence of factors 1, 2, 1, 2,.... etc. In one of the remaining counters B or C, there are added the digital values which have been multiplied by the sequence of factors 2, 1, 2, 1,..... As a result, a residual number according to the employed module will remain in the counter B (or C). In the following numerical example the number 243 serves as a number to be checked. As mentioned above, it is first extended outside the device by a checking or testing digit ("6") in such a way that the sum of partial products resulting from the multiplication of respective digits 2, 4, 3 by the factors 2, 1, 2 and divided by 10 (module), will result into a constant residual number ("2"): $2\times2+1\times4+2\times3+1\times6=20; 20:10$ (modul)$=2$.

Accordingly, two, four, three and six pulses are transmitted from generator G via AND gate members K6 and K7 to the inputs of flip-flop stage B1, and, at the same time, through inverter N1 and AND gate members K8 and K9 to the inputs of flip-flop stage C1. During the initial condition of flip-flop stage E, the output potential thereof is "1" and, consequently, the input of AND gate K13, which is connected thereto through inverter N3, has also the potential "1." Since the second input of K13 is connected with inverter N1, the first digit of the precalculated number 2436 is double-counted. However, such a duplication is executed via flip-flop stage C1 in the counter C only. Due to the fact that one input of the AND gate K10 is under the zero potential, the corresponding inputs of flip-flop stage B1 cannot accept any pulses and, as a result, the first digit of the precalculated number is stored in the counter B without any change. If the second digit ("4") of the number 2436 is keyed into the device, the flip-flop stage E is switched-over and the doubling is accomplished via AND gate K10 and the corresponding input of flip-flop stage B1, whereas for the application of the digit "4" the input is blocked through the AND gate K13 and the flip-flop stage C1. The processing of the remaining digits "3" and "6" is executed in the same manner so that at the end of the testing process the numerical values of respective digits are multiplied with factors 2, 1, 2, 1 and the counter C1 attains its initial condition again.

The outputs of flip-flop stages B1 to B4 are coupled to corresponding inputs of AND gate member K14, and the outputs of flip-flop stages C1—C4 are connected with corresponding inputs of AND gate member K15. These inputs of K15 are arranged in the manner as to correspond, after the application of all digits, to the residual number.

The residual number can be adjusted in AND gate members K14 and K15 to an arbitrary fixed value of digits in the range from 0—9. For this purpose, the inputs of AND gates K14 and K15 have two branches. In the employed numerical example, where the residual number is "2," only those conductors are connected to AND gates K14 and K15 which are coupled to the outputs of flip-flop stages B1 to B4, or C1 to C4, and which in the initial condition of counters B and C are under the "1" signal potential. The conductors I can be connected to an indicator (not shown) for the indication of actual values of corresponding flip-flops in respective counters B and C. The AND gate members K14 and K15 are provided with two additional inputs, respectively. The output from the flip-flop circuit E is connected via inverter N2 to one of the additional inputs of the AND gate member K14, and via inverter N3 to one of the additional inputs of AND gate member K15. As a consequence, a "1" binary signal passes through the output at that one of the AND gate members K14 and K15 only at which the tetrad or group of four pertaining counting stages has counted the addition. pulses of the last digit in a simple manner only. In this way it can be insured that the "importance" or weight of the last digit of the number under test is always.1 (one).

As soon as the residual number is attained, i.e., after the introduction of all digits of the number under test, the output signal at K14 or K15 actuates via a relay amplifier RV, relay R and one of the switches S1 or S2, thereof, releases the operation of the entire machine.

In order to make, according to the module 10, a sum of two digit products, there is provided a circuit arrangement for an addition of the digit 1, supplementary to the doubling of introduced digits 5 to 9. For this purpose, diode groups Gr5 through Gr9 are connected with the AND gate member K16. Upon the introduction of digits 5 to 9, the AND gate member K16 is, after a time delay, fed with "1" signal potential applied from Schmitt trigger circuits ST1, ST2 via operatively connected inverters N4 and N5. By the aid of series connected OR gate member D2, inverters N6 and N7 and the AND gate member K17, there is created a self-locking register or storing circuit SK. By opening the key contact for a digit, the self-locking register or storing circuit SK becomes interrupted by the effect of a time delayed "0" signal from the network following the Schmitt trigger circuit ST1. The pulse resulting at the output of inverter 7 affects, in response to a condition at the flip-flop circuit E, via the AND gate member K11 either the counter B, or via the AND gate member K12 the counter C. Consequently, in the case of digits 5—9 and at the weight thereof being 2, there will result a supplementary addition of one pulse as well as the double counting of the synchronizing pulses.

Simultaneously with the turning "on" of the number checking circuit, it is also energized a quenching or resetting circuit LS. Immediately upon the turning on, a "0" binary signal is applied to respective flip-flop stages of counters A, B, C, for resetting the same into their initial condition.

What we claim is:

1. A number-checking device for controlling precalculated numerals in such a manner that the digits of a numeral are alternately multiplied by factors 2 and 1, the sum of the all multiplied digits produces, according to a definite module, a constant residual number, whereby the digital order of the numeral under test can be an arbitrary order and the last factor has always a constant value, comprising a combination of digit input means, coding means for producing a code corresponding to an introduced digit, a first counter means having flip-flop stages, an adjustment pulse generator means operatively connected between the coding means and said first counter means to set the latter to a complementary value of each of the introduced digits, resetting pulse generator means for producing synchronizing pulses corresponding to the introduced digit, second and third counter means having flip-flop stages, respectively, said resetting pulse generator means being operatively coupled to said first counter means for resetting the same to its zero condition, conjunction members, said synchronizing pulses from the resetting pulse generator means being fed into said second and third counter means via said conjunction members, means for inverting the synchronizing pulses, second conjunction members for applying the inverted synchronizing pulses to said second and third counter means and a flip-flop circuit for controlling the feeding of said inverted synchronizing pulses in dependency on each introduction of a digit.

2. The number-checking device according to claim 1 wherein the checking of the precalculated numeral is carried out according to a module 10 and for the production of the sum of all digits of the numeral a sum of corresponding partial products is employed, further comprising a storing register circuit having two inputs and an output, a group of diodes for coding introduced digits from 1 to 9, a diode group portion corresponding to digits 5 to 9 being connected to one of the inputs of said register circuit, the other input of said register circuit being connected to the entire group of diodes and to a conductor for the introduction of the digit "0," and the output of the register circuit being connected through respective conjunction members to said second and third counter means.

3. The number-checking device according to claim 2 further comprising means for controlling the operation of the resetting pulse generator means in dependency on the condition in respective flip-flop stages of said first counter means.